(12) United States Patent
Jensen

(10) Patent No.: US 7,690,671 B1
(45) Date of Patent: Apr. 6, 2010

(54) TRAILER HITCH WITH ALIGNMENT MECHANISM

(76) Inventor: John J. Jensen, 1775 Henderson Ave., Eugene, OR (US) 97403

( * ) Notice: Subject to any disclaimer, the term of this patent is extended or adjusted under 35 U.S.C. 154(b) by 0 days.

(21) Appl. No.: 12/287,373

(22) Filed: Oct. 7, 2008

Related U.S. Application Data

(60) Provisional application No. 60/998,847, filed on Oct. 12, 2007.

(51) Int. Cl.
 *B60D 1/36* (2006.01)
(52) U.S. Cl. .................................................... 280/477
(58) Field of Classification Search .................. 280/477
 See application file for complete search history.

(56) References Cited

U.S. PATENT DOCUMENTS

| | | | | |
|---|---|---|---|---|
| 3,909,033 A | * | 9/1975 | Russell, Jr. ................... | 280/477 |
| 4,254,968 A | * | 3/1981 | DelVecchio ................. | 280/477 |
| 4,416,466 A | * | 11/1983 | Park ........................... | 280/477 |
| 4,903,978 A | * | 2/1990 | Schrum, III .................. | 280/477 |
| 5,114,170 A | * | 5/1992 | Lanni et al. .................. | 280/477 |
| 5,161,815 A | * | 11/1992 | Penor, Jr. ..................... | 280/477 |
| 5,769,443 A | * | 6/1998 | Muzny ....................... | 280/477 |
| 6,102,422 A | * | 8/2000 | Damron ...................... | 280/477 |
| 6,428,030 B2 | * | 8/2002 | Melesko et al. ............. | 280/477 |
| 2007/0205580 A1 | * | 9/2007 | Hamilton et al. ............ | 280/477 |

\* cited by examiner

*Primary Examiner*—Kevin Hurley
(74) *Attorney, Agent, or Firm*—Robert E. Howard

(57) ABSTRACT

An alignment mechanism for aligning the ball with the socket of trailer hitch comprised of a ball portion attached to a towing vehicle and a socket portion attached to a trailer. The alignment mechanism has an alignment body that is cylindrical-shaped having an outer wall, an upper face, a lower face, and a circular opening passing through the center of the body. The circular opening has a diameter that is substantially the same as the diameter of the socket. The upper face has a U-shaped slot and a wedge-shaped slot, the slots being adapted to receive the outer end of the socket portion. The lower face has a truncated conical surface extending upwardly and inwardly between the outer wall of the alignment body and the circular opening. A stop member extends downwardly from the truncated conical surface.

19 Claims, 3 Drawing Sheets

TRAILER HITCH WITH ALIGNMENT MECHANISM

CROSS-REFERENCE TO RELATED APPLICATIONS

This application claims the benefit of U.S. Provisional Application No. 60/998,847, filed Oct. 12, 2007, the entire contents of which are hereby incorporated by reference.

BACKGROUND OF THE INVENTION

The present invention relates to a trailer hitch with an alignment mechanism.

Trailers pulled by a vehicle are coupled together with a hitch mechanism. One of the most popular hitch mechanisms is of the ball and socket type. The ball portion is attached to the rear of the towing vehicle and faces upwardly The socket portion is attached to the trailer tongue and faces downwardly. The socket portion receives the ball portion during the hitching process, and has a locking mechanism for preventing the ball from leaving the socket until desired.

The hitching process involves a driver backing the towing vehicle towards the parked trailer and aligning the ball under the socket to allow the two to be brought together by lowering the trailer tongue to which the socket assembly is attached. Often several attempts must be made to bring the ball and socket into proper alignment, all to the frustration of the driver and assistants.

SUMMARY OF THE INVENTION

It is an object of the present invention to provide an alignment mechanism adjacent the socket of a ball and socket type trailer hitch that allows greater latitude in positioning the ball into coupling proximity to the socket, thereby reducing or eliminating the need for multiple attempts to successfully hitch the trailer to a towing vehicle.

The alignment mechanism of the present invention is for aligning the ball attached to a towing vehicle with the socket of trailer hitch attached to the tow bar of a trailer.

The alignment mechanism has an alignment body that is a cylinder having an outer wall, an upper face, a lower face, and a circular opening passing through the center of the body. The circular opening has a diameter that is substantially the same as the diameter of the socket.

The upper face has a housing on the forward portion thereof, partially surrounding the circular opening. The housing has a horseshoe-shaped slot therein. The rear portion of the upper face has a wedge-shaped slot removed therefrom. The horseshoe-shaped slot and the wedge-shaped slot are adapted to receive the outer end of the socket portion of the trailer hitch.

The lower face has a conical surface extending upwardly and inwardly between the outer wall of the alignment body and the circular opening.

A stop member extends downwardly from the conical surface at its rearward ed, and is adapted to prevent the locking lip from contacting the ball during hitching.

DESCRIPTION OF PREFERRED EMBODIMENTS

Figure 1:
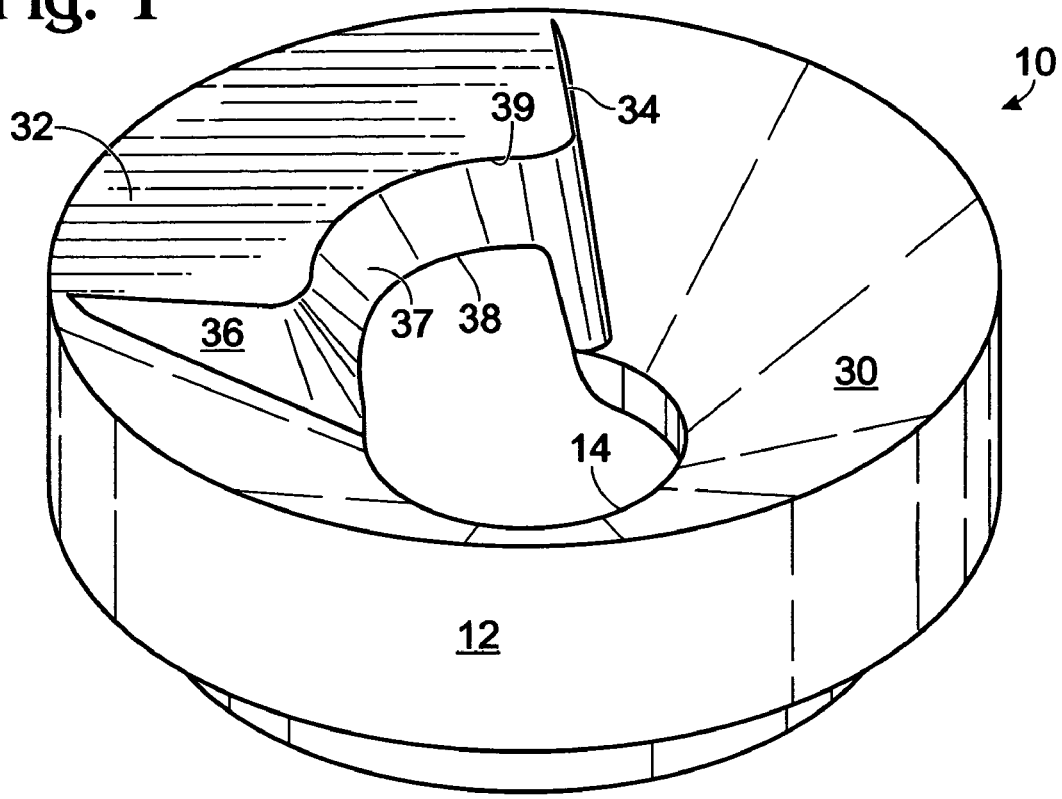
FIG. 1 is an isometric view of the bottom of the alignment mechanism.
Figure 2:
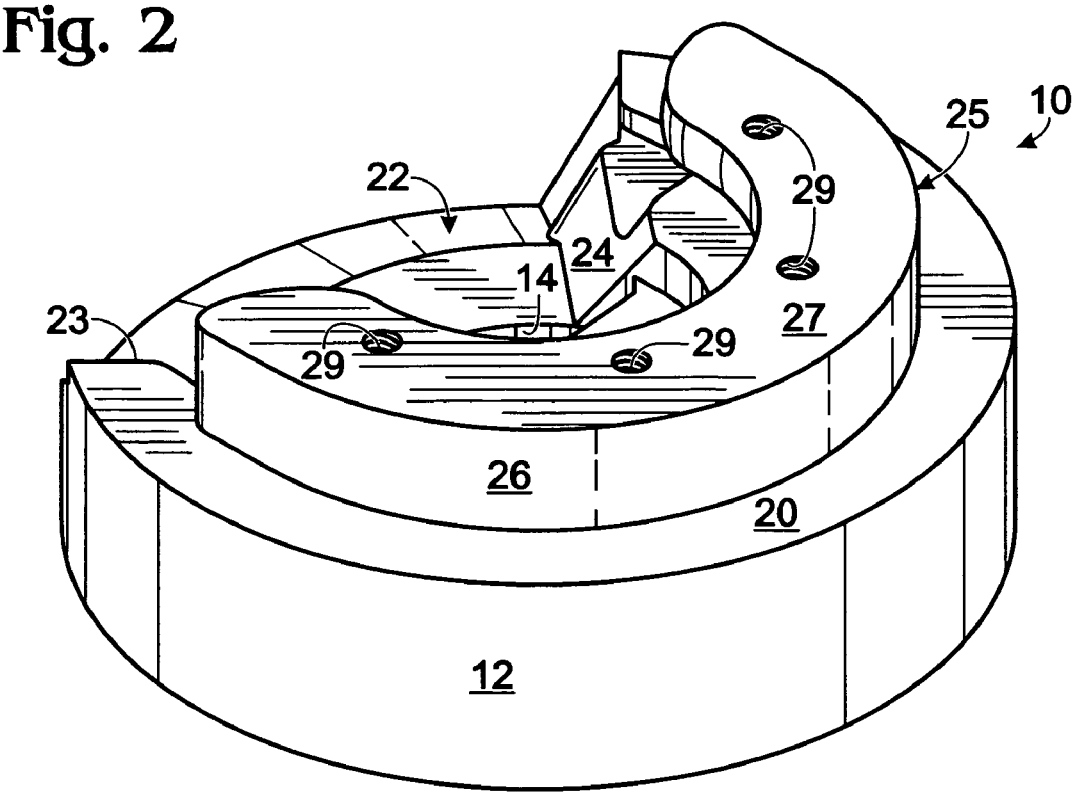
FIG. 2 is an isometric view of the top of the alignment mechanism.
Figure 3:
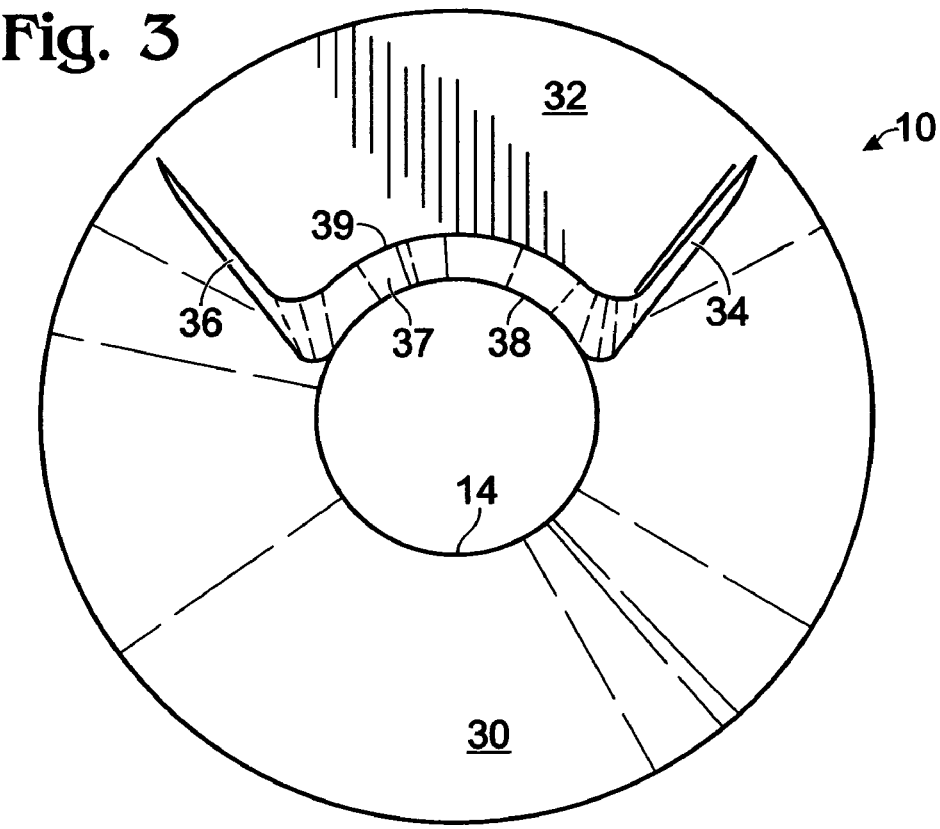
FIG. 3 is a bottom plan view of the alignment mechanism.
Figure 4:
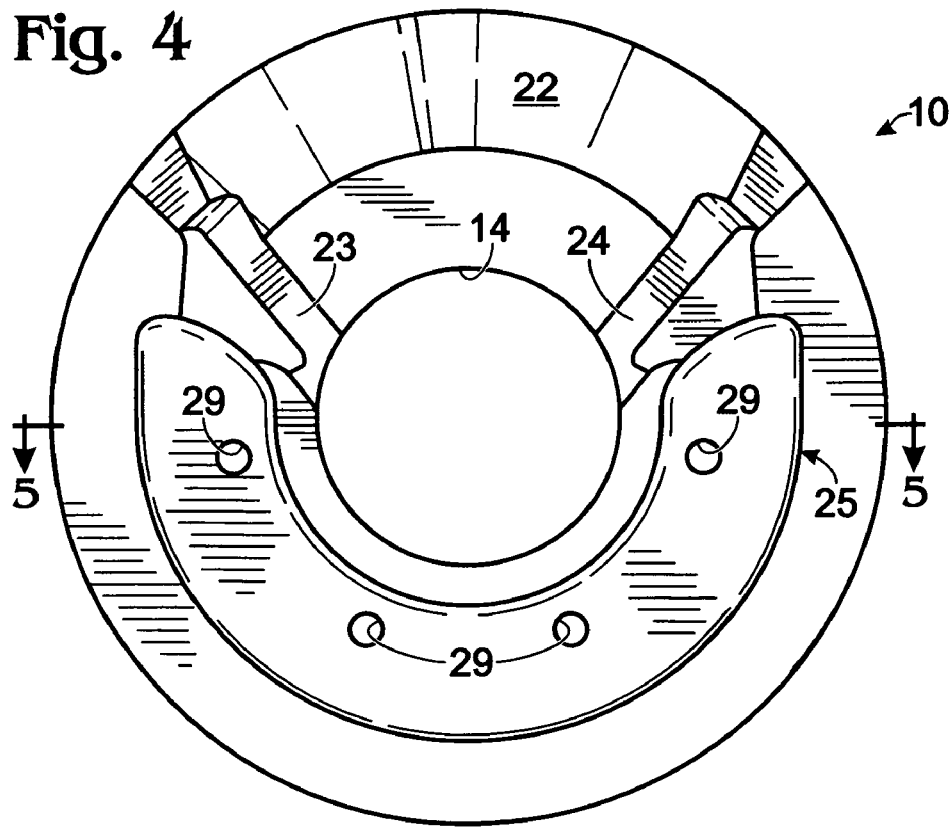
FIG. 4 is a top plan view of the alignment mechanism.

The alignment mechanism 10 of the present invention is generally cylindrical in shape. Alignment mechanism 10 is bounded by outer wall 12 and upper and lower faces 20 and 30, respectively. Alignment mechanism 10 has a circular opening 14 passing through the center thereof.

A substantial portion of upper face 20 is substantially flat. A wedge-shaped slot portion or sector 22 is removed therefrom adjacent the rearward end of said upper face 20. Slot portion 22 extends from outer wall 12 to circular opening 14, and has side edges 23 and 24. Slot portion 22 is adapted to receive the outer end of trailer hitch 40.

A U-shaped housing 25 is formed on, or attached to, the forward portion of upper face 20 with its open end facing rearwardly. Housing 25 partially surrounds circular opening 14, and is formed of an outer side wall 26 and a top wall 27. A U-shaped slot 28 is formed by the inner surfaces of outer side wall 26 and top wall 27, and the upper surface of upper face 20 adjacent circular opening 14, i.e., the upper surface of upper face 20 enclosed by housing 25. A plurality of female-threaded tapped holes 29 are vertically positioned within housing 25.

Figure 5:
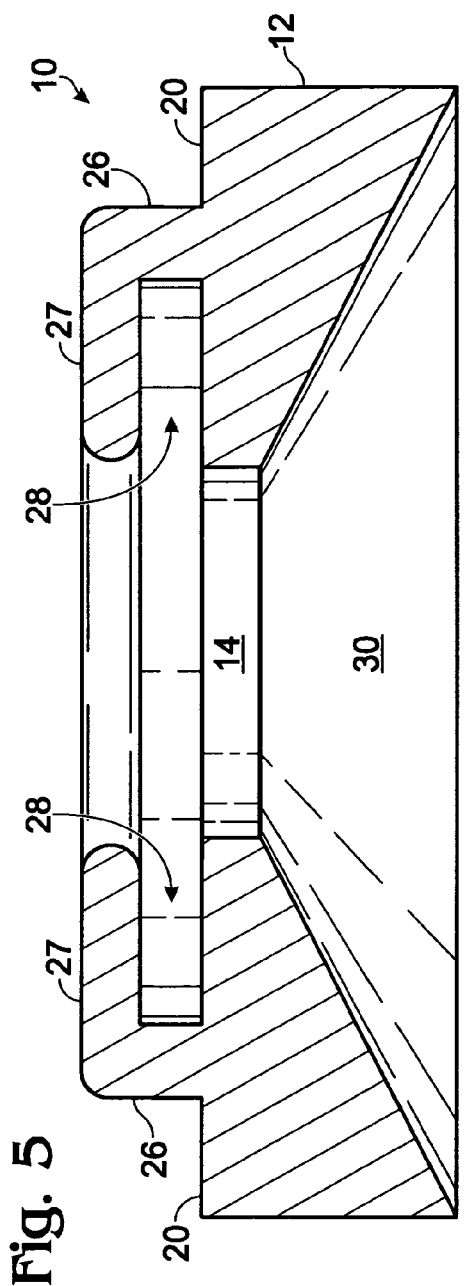
FIG. 5 is a cross-sectional view taken along line 5-5 of FIG. 4.

As best seen in FIGS. 1 and 5, a substantial portion of lower face 30 slopes upwardly (i.e., towards upper face 20) and inwardly from outer wall 12 to circular opening 14, and forms a truncated conical surface.

A wedge-shaped stop member 32 extends from outer wall 12 to opening 14 and has substantially triangular-shaped side edges 34 and 36. Stop member 32 is located adjacent the rearward portion of lower face 30. The outer edge of stop member 32 is coextensive with the adjacent outer periphery of alignment mechanism 10. The height of side edges 34 and 36 adjacent circular opening 14 is substantially the same as the height of outer wall 12. Inner face 37 of stop member 32 has an upper edge 38 and a lower edge 39. Upper edge 38 is coextensive with the adjacent edge of circular opening 14. Inner edge 37 slopes downwardly and outwardly from upper edge 38 to lower edge 39 to accommodate any motion of the hitch ball during towing.

That portion of slot 22 and stop member 32 coextensive with the outer wall 12 of alignment mechanism 10 occupies about 20-33% of the circumference of alignment mechanism 10. Slot 22 and stop member 32 are located substantially opposite each other.

Figure 6:
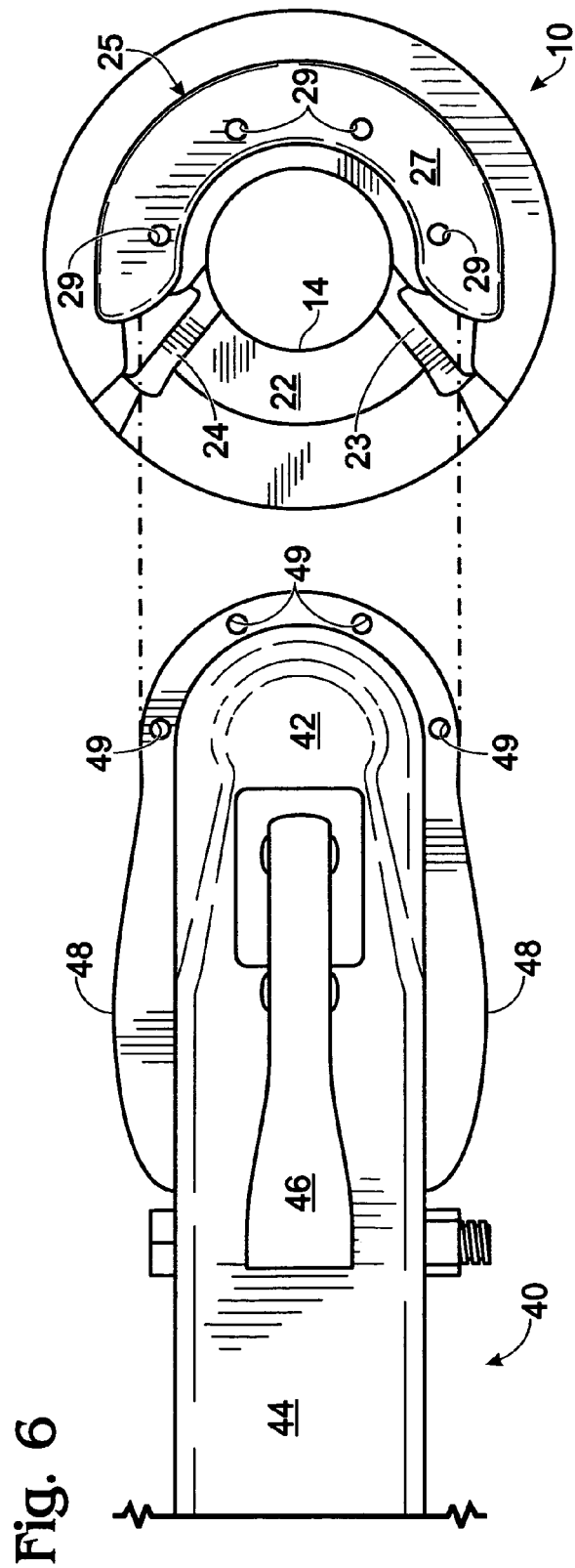
FIG. 6 is an exploded top view of the alignment mechanism and the socket portion of a trailer hitch.

The alignment mechanism 10 of the present invention is adapted to be attached to a ball receiving hitch member 40 of a trailer tow bar. Such ball receiving hitch members are well known in the art, and a typical such trailer hitch member 40 is generically illustrated in FIG. 6. Trailer hitch member 40 includes a ball receiving socket 42, the opening of which faces downwardly as well known in the art. The socket 42 is located at the outer end of a socket bar 44 which is attached to the draft tongue of a trailer (not shown) in a manner well known in the art, such as by use of bolts. The socket 42 has a locking mechanism that typically includes a cam and spring loaded locking lever 46 having a locking lip (not shown) attached to its lower end in a manner well known in the trailer hitch art. Ball receiving hitch member 40 includes a flange 48 located along the periphery thereof. A plurality of openings 49 are located in flange 48 in locations adapted to align with female-threaded tapped holes 29 of alignment mechanism 10 when positioned thereon.

The alignment mechanism 10 is attached to the outer end of the hitch member 40 by inserting flange 48 into horseshoe-shaped slot 28 with circular opening 14 being in alignment with socket 42. The two are attached together by threaded fasteners (not shown) passing through openings 49 and into threaded engagement with tapped holes 29, or by any other suitable attachment means.

In use, the tongue of the trailer to which socket hitch member 40 and alignment mechanism 10 are attached is raised to a suitable height for coupling to a towing vehicle by use of a conventional screw jack means. The towing vehicle is then backed into a position wherein the ball of the hitch means on the towing vehicle is within the circumference of the lower surface 30 not occupied by stop member. Since the circumference of the alignment mechanism 10 is much larger than the circumference of the socket 42, far less accuracy is required in positioning the ball of the towing vehicle. The tongue of the trailer is then lowered until contact is made between the ball of the towing vehicle and the alignment mechanism 10. Due the truncated conical shape of the lower face 30 of alignment mechanism 10, and the upward force exerted by the ball of the towing vehicle, the alignment mechanism 10 causes the trailer tongue to move so that the ball of the towing vehicle passes through circular opening 14 and enters the socket 42 of hitch member 40 or, alternatively, can be manually moved.

During the hitching process stop member 32 of alignment mechanism 10 prevents the ball of the towing vehicle from coming into contact with the locking lip of hitch member 40 which could cause it to move inwardly and interfere with the entry of the ball into socket 42.

The alignment mechanism 10 may be used to align the hitching members of fifth wheelers, in which case stop member 32 may be omitted.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An alignment mechanism for aligning the ball portion attached to the hitch of a towing vehicle with the socket portion of a trailer hitch attached to a trailer, said alignment mechanism comprising:
a substantially cylindrical-shaped alignment body having a forward end and a rearward end, said alignment body having an outer wall, an upper face, a lower face, and a circular opening passing substantially through the center of said body, said circular opening having a diameter that is substantially the same as the diameter of said socket;
said upper face having a wedge-shaped slot removed therefrom adjacent said rearward end of said alignment body, said wedge-shaped slot adapted to receive the outer end of said trailer hitch containing said socket portion;
said lower face having a truncated conical surface extending upwardly and inwardly between said outer wall and said circular opening.

2. The alignment mechanism of claim 1 including a stop member occupying a portion of said truncated conical surface of said lower face adjacent said rearward end of said alignment body.

3. The alignment mechanism of claim 2 wherein said stop member is wedge-shaped and extends from said outer wall of said alignment body to said circular opening.

4. The alignment mechanism of claim 3 wherein said stop member has an outer edge that is substantially coextensive with the adjacent outer periphery of said alignment mechanism, and an inner face having an upper edge and a lower edge, said upper edge being substantially coextensive with the adjacent edge of said circular opening.

5. The alignment mechanism of claim 4 wherein said inner face of said stop member slopes downwardly and outwardly from said upper edge to said lower edge.

6. The alignment mechanism of claim 4 wherein said outer edge of said stop member occupies about 20% to about 33% of the circumference of said alignment mechanism.

7. The alignment mechanism of claim 1 wherein said upper face has a wedge-shaped sector removed therefrom adjacent said rearward end of said upper face, said sector adapted to receive said socket portion of said trailer hitch.

8. The alignment mechanism of claim 7 wherein said upper face includes a U-shaped slot having an open end that faces rearwardly.

9. The alignment mechanism of claim 8 wherein said upper face includes a U-shaped housing located on the forward portion of said upper face, said housing partially surrounding said circular opening, said housing being formed of an outer side wall and a top wall, the inner surfaces of said outer side wall and said top wall, together with the upper surface of said upper face enclosed by said housing, form said U-shaped slot.

10. The alignment mechanism of claim 9 wherein said housing has a plurality of tapped holes containing female threads adapted to receive threaded fastening members.

11. A self-aligning socket portion of a ball and socket trailer hitch comprising:
a socket arm having inner and outer ends and adapted to be attached at said inner end to the tongue of a trailer, said socket arm having a peripheral flange portion;
said outer end having a socket adapted to receive said ball;
said outer end of said socket arm having an alignment mechanism attached thereto;
said alignment mechanism comprising an alignment body, said alignment body being substantially in the shape of a cylinder having an outer wall, an upper face, a lower face, and a circular opening passing through the center of said body, said circular opening having a diameter that is substantially the same as the diameter of said socket, said circular opening and said socket being in alignment with each other;
said upper face having a U-shaped slot into which the outer portion of said peripheral flange portion of said socket arm is positioned;
said lower face having a truncated conical surface extending upwardly and inwardly between said outer wall and said circular opening.

12. The alignment mechanism of claim 11 including a stop member occupying a portion of said truncated conical surface of said lower face adjacent said rearward end of said alignment body.

13. The alignment mechanism of claim 12 wherein said stop member is wedge-shaped and extends from said outer wall of said alignment body to said circular opening.

14. The alignment mechanism of claim 13 wherein said stop member has an outer edge that is substantially coextensive with the adjacent outer periphery of said alignment mechanism, and an inner face having an upper edge and a lower edge, said upper edge being substantially coextensive with the adjacent edge of said circular opening.

15. The alignment mechanism of claim 14 wherein said inner face of said stop member slopes downwardly and outwardly from said upper edge to said lower edge.

16. The alignment mechanism of claim 14 wherein said outer edge of said stop member occupies about 20% to about 33% of the circumference of said alignment mechanism.

17. The alignment mechanism of claim 11 wherein said upper face has a wedge-shaped sector removed therefrom adjacent said rearward end of said upper face, said sector adapted to receive said socket portion of said trailer hitch.

18. The alignment mechanism of claim 11 wherein said upper face includes a U-shaped housing located on the forward portion of said upper face, said housing partially surrounding said circular opening, said housing being formed of an outer side wall and a top wall, the inner surfaces of said outer side wall and said top wall, together with the upper surface of said upper face enclosed by said housing, form said U-shaped slot.

19. The alignment mechanism of claim 18 wherein said housing has a plurality of tapped holes containing female threads, and the outer end of said peripheral flange has plurality of openings in alignment with said plurality of tapped holes, said tapped holes and said openings adapted to receive threaded fastening members for attaching said alignment mechanism to said outer end of said socket arm.

* * * * *